US007486177B2

(12) United States Patent
Wilbrink et al.

(10) Patent No.: US 7,486,177 B2
(45) Date of Patent: Feb. 3, 2009

(54) SYSTEM AND METHOD FOR PERFORMING INTERVENTIONS IN CARS USING COMMUNICATED AUTOMOTIVE INFORMATION

(75) Inventors: Tijs I. Wilbrink, EN Leiden (NL); Edward E. Kelley, Wappingers Falls, NY (US); William D. Walsh, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/306,665

(22) Filed: Jan. 6, 2006

(65) Prior Publication Data

US 2008/0111670 A1 May 15, 2008

(51) Int. Cl.
*B60Q 1/00* (2006.01)

(52) U.S. Cl. ....................... 340/438; 340/436; 340/903; 701/96; 180/169; 342/70

(58) Field of Classification Search ................. 340/436, 340/435, 438, 903; 701/96; 180/167, 168, 180/169, 170; 342/70, 175, 195
See application file for complete search history.

(56) References Cited

U.S. PATENT DOCUMENTS 5,529,138 A * 6/1996 Shaw et al. ................. 180/169
5,710,565 A * 1/1998 Shirai et al. .................... 342/70
5,983,161 A 11/1999 Lemelson et al.
6,025,797 A * 2/2000 Kawai et al. .................. 342/70
6,311,121 B1 * 10/2001 Kuragaki et al. .............. 701/96
6,567,737 B2 * 5/2003 Nakamura et al. ............ 701/96
2003/0169181 A1 9/2003 Taylor
2003/0227375 A1 12/2003 Yong
2005/0048946 A1 3/2005 Holland et al.

FOREIGN PATENT DOCUMENTS

JP 2001266291 A2 9/2001

* cited by examiner

*Primary Examiner*—Anh V La
(74) *Attorney, Agent, or Firm*—Ronald Kaschak; Hoffman Warnick LLC

(57) ABSTRACT

A system and method for performing real-time interventions in a vehicle based on dangerous conditions. A system is provided that includes: a feature collection system that identifies features on both a current vehicle and at least one nearby vehicle, and stores the features; an events manager that defines a criteria which constitutes a dangerous condition for each of a set of features, and further determines what intervention should take place in response to a dangerous condition; and an information processing system that compares sensor inputs to the criteria to determine if a dangerous condition currently exists.

20 Claims, 8 Drawing Sheets

| ID | Feature | Type | Availability | Status | Sensor |
|---|---|---|---|---|---|
| 1 | Belt warning system | In-car | Working properly | NA | Yes/No |
| 2 | Distance control | In-car | .. | ... | Meters |
| 3 | Awakeness | In-car | | | |
| 4 | Children on board | In-car | | | |
| | .... | | | | |
| N | Bluetooth | Outbound communication | | | |
| N+1 | GSM | Outbound communication | | | |
| N+2 | Laptop | Outbound communication | | | |
| N+3 | | Mobile device | | | |
| | | ... | | | |
| | | | | | |

TABLE 1

FIG. 5

TABLE 2A

| ID | Feature |
|---|---|
| 1 | Belt warning system |
| 2 | Distance control |
| 3 | Awakeness |
| 4 | ... |

TABLE 2B

| ID | Feature |
|---|---|
| 1 | GSM |
| 2 | Laptop |
| 3 | Bluetooth device |
| 4 | ... |

FIG. 6

TABLE 3

| Type | Details | Effect |
|---|---|---|
| Disabilities | Night blindness | 6PM to 8AM raised system awareness |
| Reaction time | Long | Assist with incidents also after 0.2 sec |
| ... | | |
| Emergency phone numbers | Hospital: 134<br>911<br>Family ... | N/A |
| ... | | |

FIG. 7

TABLE 4

| ID | Sensor | Range for danger | Dependencies | Relation | Type of intervention (43) |
|---|---|---|---|---|---|
| 1. | Belt warning system | N/A | N/A | N/A | (1) noises like horn |
| 2. | Distance in front | 0 to 30 meters | Speed meter (ID 6) | (Distance) **x** (speed) < [*value*] | (2) vibrations |
| 3. | Speed meter | 0 to *max* km/h | Speed meter (ID 2) | (Distance) **x** (speed) < [*value*] | (3) braking |
| ... | | | | | |

FIG. 8

SYSTEM AND METHOD FOR PERFORMING INTERVENTIONS IN CARS USING COMMUNICATED AUTOMOTIVE INFORMATION

BACKGROUND OF THE INVENTION

1. Technical Field

The present invention relates generally to communication among automotive vehicles, and more specifically relates to a system and method for performing interventions in cars utilizing communicated automotive information.

2. Related Art

Over the past few decades, automobiles have become significantly more sophisticated. All of the old mechanics have been replaced by electronic systems, e.g., when you accelerate, brake, turn, etc., there is no direct mechanical connection to the engine or wheels. Instead, electronic signals are sent to a computer that controls operations. In addition, modern vehicles include numerous sensors that identify problems. Examples include sensors that indicate low fuel, low oil, worn belts, etc.

Unfortunately, little effort has been put forth to fully exploit this information to improve driving safety for surrounding drivers. While automobiles do exploit some information internally to, for instance, employ airbags, implement cruise control that switches off under various scenarios etc., the information is not utilized in a manner that can be beneficial to nearby motorists.

For instance, MERCEDES BENZ® has developed a cruise control based on radar, which detects if the distance is becoming smaller between you and the automobile in front of you. The information is automatically translated into a speed reduction of your own car.

It is also known that devices within a car have their own Internet capabilities, such as an IP address or a GSM (Global System for Mobile Communications, which is a digital mobile telephone system that is widely used in Europe and other parts of the world) identifier that can be called in cases of emergency or theft. Also known are intelligent systems that track braking, etc., to determine the cost of insurance.

However, none of these systems provide information to nearby drivers to improve overall safety on the road. Accordingly, a need exists for a system and method that can exploit information processed within a vehicle by communicating the information to nearby drivers.

SUMMARY OF THE INVENTION

The present invention addresses the above-mentioned problems, as well as others, by providing a system and method for utilizing wireless communications technology, such as Bluetooth, GSM, etc., in automotive vehicles to communicate automotive information and initiate interventions. The proposed solution is to utilize a wireless device in the vehicle that processes driving and vehicle information such as acceleration, braking, future driving moves (e.g., via a global positioning system "GPS"), and sensor warnings. That information is analyzed by the system, which can broadcast sensor information, features or warning messages to surrounding cars to, e.g., adjust braking and acceleration to prevent collisions or minimize damage.

In a first aspect, the invention provides a real-time intervention system for analyzing information in a vehicle relating to dangerous conditions, comprising: a feature collection system that identifies features on both a current vehicle and at least one nearby vehicle, and stores the features; an events manager that defines a criteria which constitutes a dangerous condition for each of a set of features, and further determines what intervention should take place in response to a dangerous condition; and an information processing system that compares sensor inputs to the criteria to determine if a dangerous condition currently exists.

In a second aspect, the invention provides a computer program product stored on a computer useable medium, which when executed, processes information in a vehicle regarding dangerous conditions, the computer program product comprising: program code configured for identifying features on both a current vehicle and nearby vehicles, and for storing the features; program code configured for providing a criteria regarding what constitutes a dangerous condition for each of a set of features, and further determines what intervention should take place in response to a dangerous condition; and program code configured for comparing sensor inputs to the criteria to determine if a dangerous condition currently exists.

In a third aspect, the invention provides a method of performing interventions in a vehicle based on dangerous conditions, comprising: identifying features on both a current vehicle and at least one nearby vehicle; storing the features in a features table; implementing an events table having criteria regarding what constitutes a dangerous condition for each of a set of features, and further determines what intervention should take place in response to a dangerous condition; comparing sensor inputs to criteria in the events table to determine if a dangerous condition currently exists; and initiating an intervention in the event a dangerous condition currently exists.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a master feature table in accordance with the present invention.

FIG. 6 depicts a set of feature profile tables in accordance with the present invention.

FIG. 7 depicts a user preferences table in accordance with the present invention.

FIG. 8 depicts an events table in accordance with the present invention.

DETAILED DESCRIPTION

Figure 1:
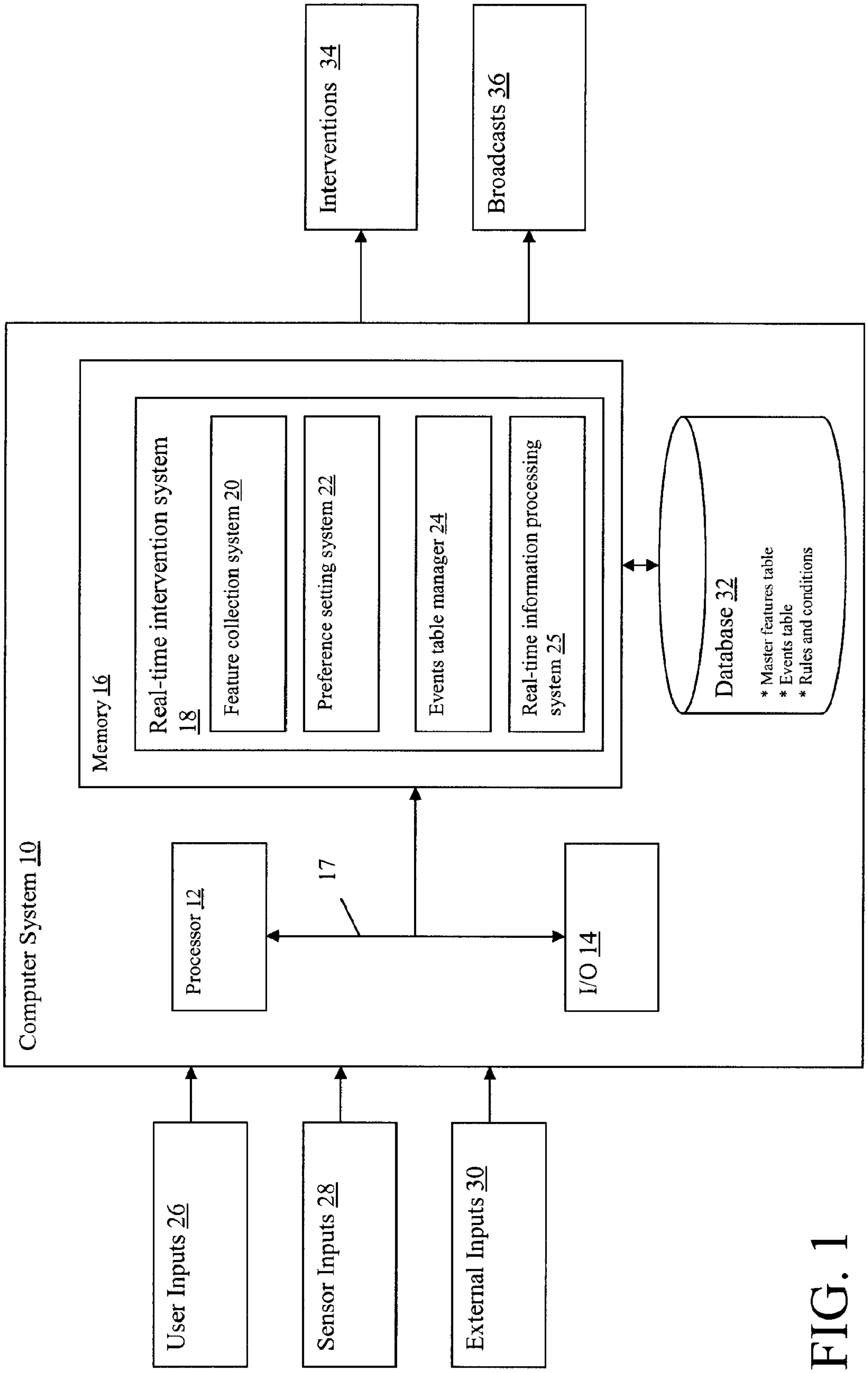
FIG. 1 depicts a computer system having a real-time intervention system in accordance with the present invention.

Referring now to drawings, FIG. 1 depicts a computer system 10 having a real-time intervention system 18 for generating interventions 34 within a vehicle. In general, real-time intervention system 18 would reside inside a vehicle in communication with an on-board computer. Real-time intervention system 18 identifies dangerous situations and takes corrective actions by analyzing: (1) features on the current vehicle and surrounding vehicles; (2) sensor inputs 28 on the current vehicle and surrounding vehicles; and (3) external inputs 30, e.g., road, weather, etc. It should be understood that the invention could be utilized within any type of automotive vehicle, e.g., car, truck, bus, train, boat, etc. In addition to analyzing sensor inputs 28 and external inputs 30, information processing system 25 can also generate broadcasts 36 to nearby vehicles.

Real-time intervention system 18 includes a feature collection system 20 that identifies what features are available for analysis. Features may include: (1) safety features, e.g., airbags, antilock brakes, warning system, etc., and (2) communication features, e.g., GPS, GSM, cellular, wireless, Bluetooth, etc. Features may be obtained from the current vehicle and/or one or more nearby vehicles. Feature information is stored, e.g., in a master features table within a database 32. Feature collection system 20 also continuously monitors external inputs 30 to identify any communication broadcasts from one or more nearby vehicles. Any communications and/or features disclosed in those communications are also added to the master features table.

A preference setting system 22 is provided to allow individual users to enter user inputs 26 that might affect driving capabilities. For instance, if a user suffered from night blindness, then this information could be inputted. This information can later be used to set/augment boundaries regarding what dictates a dangerous condition.

An events table manager 24 implements and manages an events table that determines when a dangerous condition exists for a particular feature and what intervention should be taken. The entries in the events table are largely determined based on what features exist in the master features table, user preferences, and a database of rules and conditions that should give rise to an intervention. For instance, if a vehicle is equipped with a distance control feature that can take corrective action based on a distance between a current vehicle and a vehicle in front, the events table manager 24 will build an entry regarding what intervention should be taken in the event a vehicle is too close. Both the events table and rules and conditions may be stored in database 32.

Real-time information processing system 25 provides a real-time system for analyzing sensor inputs 28 and external inputs 30 for events listed in the events table, and subsequently implementing any interventions, if necessary. An illustrative implementation of a real-time intervention system 18 is described in detail below with respect to FIGS. 2-9.

In general, computer system 10 may comprise any type of computing device. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External resources may comprise any known type of sensor, device, communication system, computing system or database. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Communication to computer system 10 may be provided over any type of wireless network, e.g., cellular, Bluetooth, WiFi, GSM, point to point, etc. Further, as indicated above, communication could occur in a client-server or server-server environment.

Figure 2:
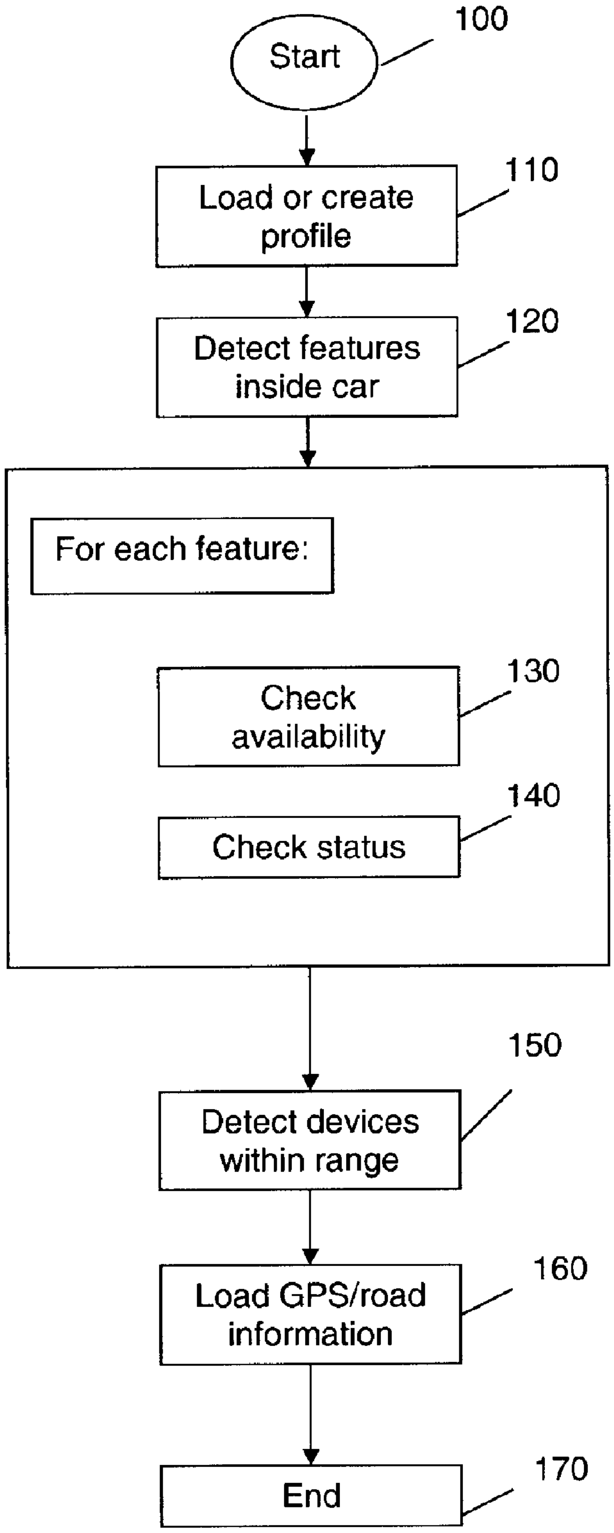
FIG. 2 depicts a flow diagram of a method for collecting feature information in accordance with the present invention.

Referring to FIG. 2, a flow diagram of a method for collecting feature information is shown. First, as step 100, the process is started when the vehicle starts. At step 110, a check is made to determine if a feature profile for the vehicle is already available. If yes, then the feature profile is loaded from one or more feature tables, such as Tables 2A and 2B shown in FIG. 6. As shown in FIG. 6, a first feature table 2A is shown that includes safety features, such as a Belt Warning System, Distance Control, and Awakeness. These features generally comprise vehicle safety options that exist in the current vehicle. A second feature table 2B includes communication and processing features such as GSM, laptop, and Bluetooth Device. These features generally comprise communication and processing devices available to the vehicle. Next, a thorough check of available features (beyond what was loaded from the features tables) occurs at step 120, such as an anti-lock braking system, car data, GPS, etc. Thus, if no feature profile is exists, one is dynamically created. Similarly, if one does exist, it can be dynamically augmented.

Next, for each existing feature, the feature's availability is detected at step 130. For instance, an airbag might have been detected, but is inoperative because, e.g., it reports an error or simply has been used before. At step 140, a status for each feature that requires resources is obtained. For example, a fuel tank might be almost empty, which would raise an alert to the system as the vehicle might suddenly run out of fuel.

At step 150, any nearby communication devices within the vehicle's range are detected. Illustrative devices include, for instance, GPS, GSM devices, laptop computers, etc. If no profile is available for a detected device, then this information is acquired and stored (e.g., downloaded from the Internet). At step 160, GPS road information, weather information, etc., if available, is loaded (e.g., road information, as barriers, closures, etc.). The resulting information is placed into a master feature table, such the one illustrated in Table 1 in FIG. 5. Steps 150 and 160 continuously run to monitor surrounding broadcasts. At step 170, the process ends when the vehicle is turned off.

Figure 3:
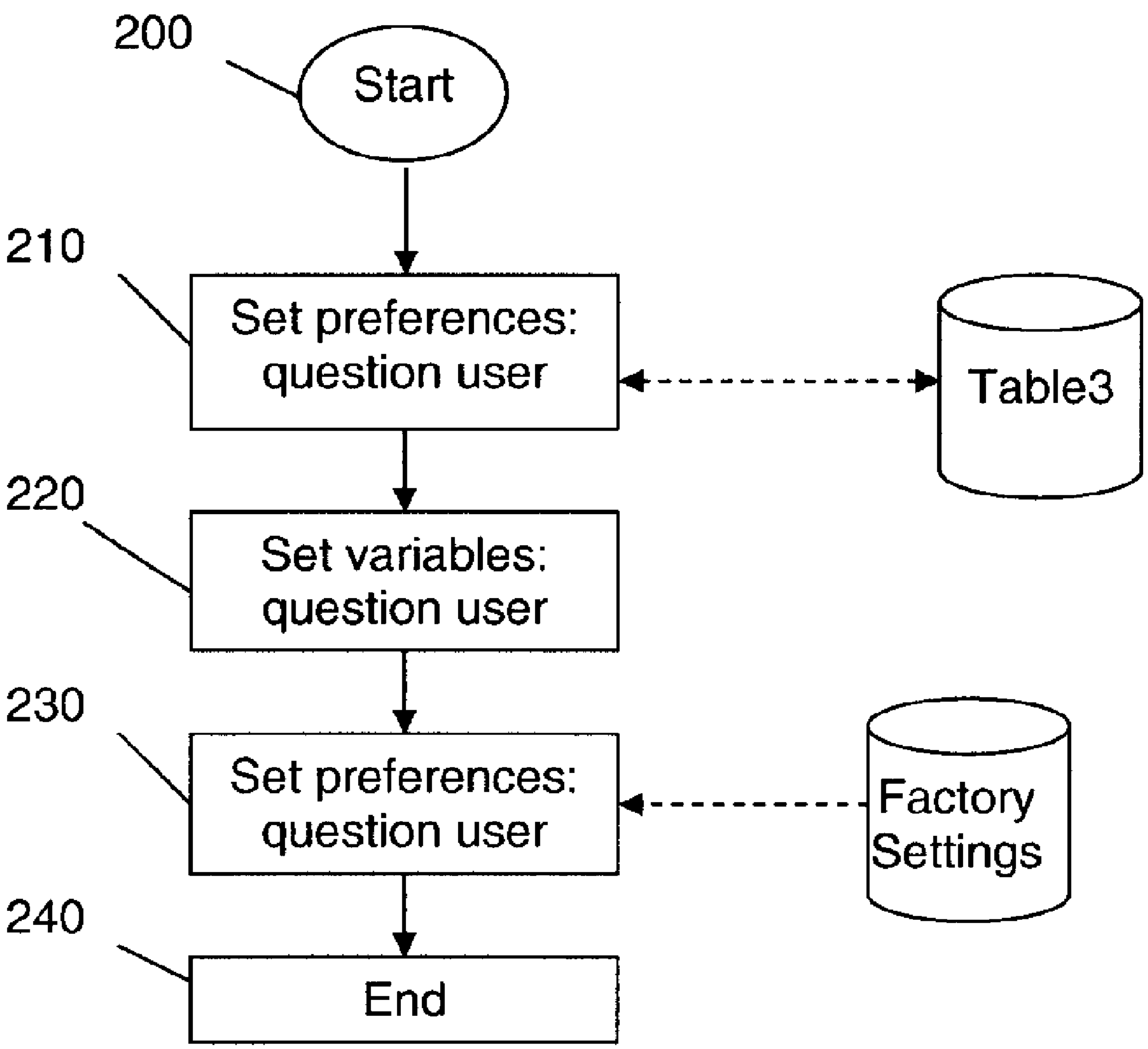
FIG. 3 depicts a flow chart showing a method for setting personal preferences in accordance with the present invention.

FIG. 3 depicts a flow chart showing a method for setting personal preferences. This would typically be done for each driver of the vehicle to provide any additional information that may be relevant to reducing dangerous situations. At step 200, the process is started when the system is launched for the first time. If not already available, the user is prompted with questions to set his/her personal preferences at step 210. Questions are derived from elements that are found to be relevant, such as conditions that may afflict the driver, such as night blindness, what is the driving history of the user, etc. The collected information is then stored in a table, such as Table 3 shown in FIG. 7. Each piece of information, such as driver ability, driver impairments, driver's history, etc., represents a variable that may be collected during this process. At step 220, additional variables specific to any current conditions may also be set each time a user enters the vehicle by again prompting the user with a set of standard questions. Such questions may for instance relate to driver ability, e.g., any use of medicine that might affect driving behavior? Additional questions are raised to help the timing of how this might affect driving. At step 230, factory preferences are loaded into the table, which may also be updated based on new safety regulations or adding new features to the vehicle (i.e. more airbags). At step 240, the process ends.

Figure 4:
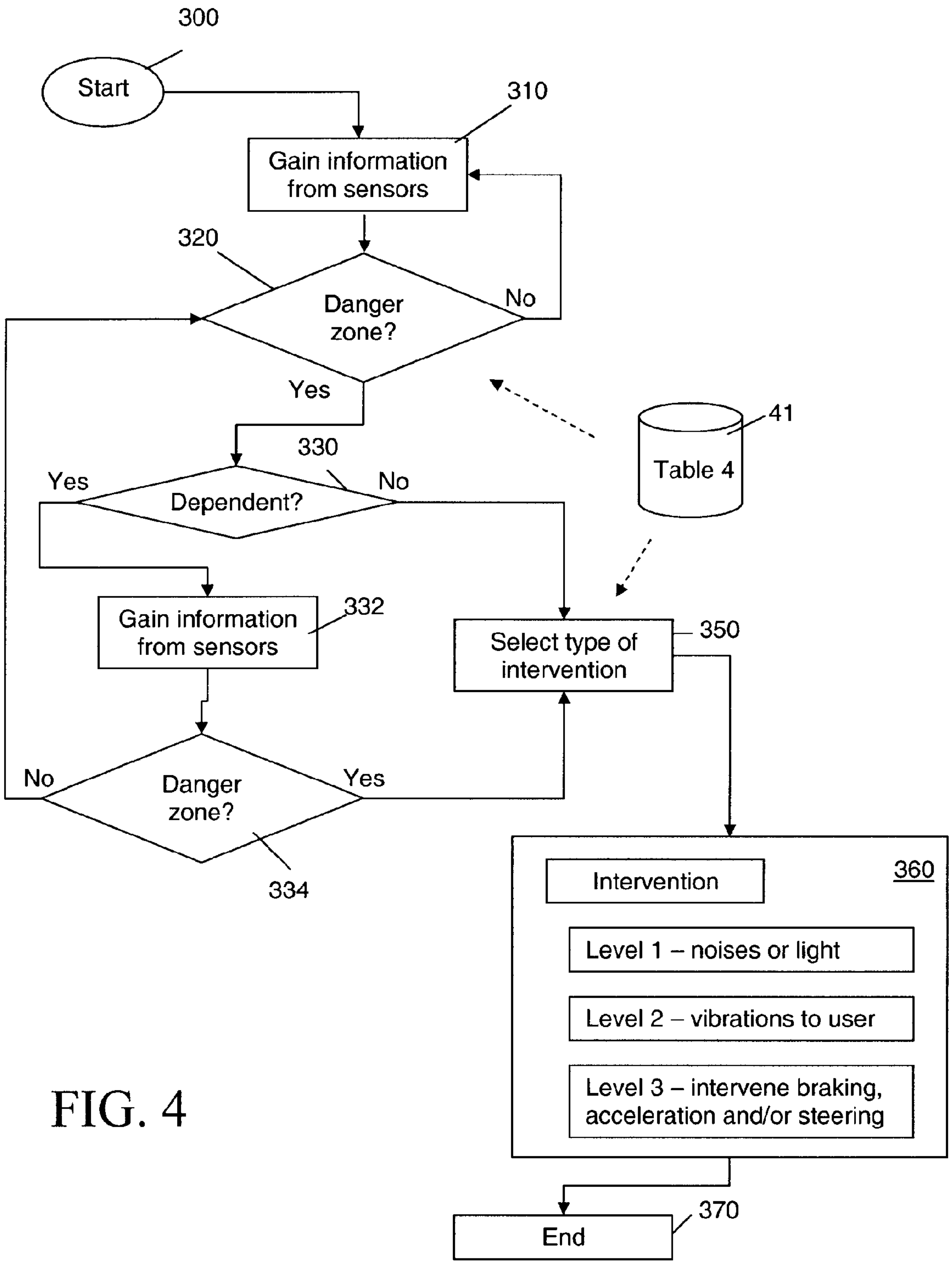
FIG. 4 depicts a flow diagram of a system for processing real-time information for use in a vehicle in accordance with the present invention.

Referring now to FIG. 4, a flow diagram of a system for processing real-time information for use in a vehicle is shown. The process starts at step 300 when the engine is started or the vehicle begins moving. At step 310, based on the feature profiles stored in the master feature table (Table 1), information is continuously collected: (1) from available sensors within the vehicle; (2) from any communication devices from other nearby vehicles that broadcast sensor information; or (3) from external devices such as GPS. At step 320, the process continuously loops to determine if any reported values are within a danger zone. This process is determined by information stored in an events table, such as that shown in Table 4 in FIG. 8. As shown in Table 4, each sensor includes thresholds or criteria that define a danger zone. For instance, for ID 2, if a distance to another vehicle in front of the current vehicle is 0-30 meters, then a dangerous situation exists. Similarly, if another vehicle broadcasts a belt warning, then a dangerous situation exists. Although not shown, preference data, such as that described above in Table 3 (FIG. 7) can be used to augment the events table. For instance, if a nearby driver has trouble seeing at night, then the criteria for defining a dangerous situation may be changed if the nearby driver is encountered at night time hours.

If a sensed value is within a danger zone, then at step 330, a determination is made if that value is dependent on other factors to determine whether an intervention is required. For example, a nearby vehicle may be broadcasting a belt warning, but if the nearby vehicle already passed by in the opposite direction, it probably does not create a dangerous situation. Alternatively, if the vehicle broadcasting the problem is in front of the current vehicle, then a dangerous situation may exist. In this case, because the determination "depends" upon the position of the other vehicle, "dependent" positional information would be required. Accordingly, if dependent information is required, input is gained from the dependent sensors at step 332. At step 334, a further evaluation is made to determine if an intervention is required based on the dependent sensors. If not, control loops back up to step 320, and the dependent sensors are examined again (this indicates a potentially dangerous situation in progress based on a single sensor value). If no dependent sensors are required at step 320 or the dependent sensors indicate an intervention is required, then control passes to step 350, where a type of intervention is selected. The type of intervention is selected from an events table (e.g., Table 4). For instance, an intervention may be to cause a vibration in the steering wheel if the vehicle in front is too close (ID 2).

As shown in step 360, for each sensor and/or each value, a series of heightening interventions that increase control or reduces risk of damage may be implemented. For instance, a first intervention may comprise noises like a horn or light signals; a second intervention may comprise vibrations to gain attention of the user; a third intervention may take corrective action, like initiate braking, steering or acceleration. At step 370, the processing of the current intervention ends.

As noted above, Table 4 provides an event table that includes data thresholds, or boundaries, that define dangerous situations for collected sensor data. Note that combinations of boundaries may also be set up to define a dangerous situation. These boundaries can be fed back into the events table to enable easy identification of potentially dangerous situations. Within each range can be included a flag indicating it relates to a combinatory event that might lead into a dangerous situation. When the sensor reports a value within that danger range, the immediate next process step is to determine if the other dependent value is within the defined danger value as well. This immediate step reduces the amount of time the dependent sensors are processed.

Additionally, the system can sort a standard list of sensor sequences based on: (1) importance of the event to a dangerous situation, and (2) likelihood of an event to be detected through a specific sensor.

Typically, the system would reside in the vehicle's computer itself, as that makes it easier to control features within the vehicle. Most of the interventions limit damage by processing more information and responding faster than is possible for an actual driver (milliseconds versus 0.1 to 0.2 seconds for humans). Note however that the driver is given priority control over the system, such that the driver remains in control. The system would still react within the first 0.1-0.2 seconds after an intervention is required, after which the user might be expected to react.

It should be appreciated that the teachings of the present invention could be offered as a business method on a subscription or fee basis. For example, control over computer system 10 could be created, maintained and/or deployed by a service provider that offers the functions described herein for customers. That is, a service provider could offer to provide subscription based services that control the real-time intervention system 18 described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A real-time intervention system for analyzing information in a vehicle relating to dangerous conditions, comprising:

a feature collection system that identifies features on both a current vehicle and at least one nearby vehicle, and stores the features, wherein at least one of the features is indentified based on input from a communication system of the at least one nearby vehicle;

an events manager that defines a criteria which constitutes a dangerous condition for each of a set of features, and further determines what intervention should take place in response to a dangerous condition; and an information processing system that compares sensor inputs to the criteria to determine if a dangerous condition currently exists.

2. The real-time intervention system of claim 1, wherein the information processing system initiates an intervention in the event a dangerous condition currently exists.

3. The real-time intervention system of claim 1, wherein the feature collection system identifies features stored in a features profile.

4. The real-time intervention system of claim 1, wherein the feature collection system determines an availability and a status of each identified feature.

5. The real-time intervention system of claim 1, wherein the feature collection system detects external inputs from at least one nearby vehicle.

6. The real-time intervention system of claim 1, wherein the feature collection system collects external conditions selected from the group consisting of: a road condition, a weather condition, and a road closure.

7. The real-time intervention system of claim 1, further comprising a system for inputting user preferences that augment the criteria regarding what constitutes a dangerous condition.

8. A computer program product stored on a computer useable medium, which when executed, processes information in a vehicle regarding dangerous conditions, the computer program product comprising:

program code configured for identifying features on both a current vehicle and nearby vehicles, and for storing the features, wherein at least one of the features is identified based on input from a communication system of the at least one nearby vehicle;

program code configured for providing a criteria regarding what constitutes a dangerous condition for each of a set of features, and further determines what intervention should take place in response to a dangerous condition; and program code configured for comparing sensor inputs to the criteria to determine if a dangerous condition currently exists.

9. The computer program product of claim 8, further comprising program code for initiating an intervention in the event a dangerous condition currently exists.

10. The computer program product of claim 8, wherein the program code configured for identifying features identifies features stored in a features profile.

11. The computer program product of claim 8, wherein the program code configured for identifying features determines an availability and a status of each identified feature.

12. The computer program product of claim 8, wherein the program code configured for identifying features detects external inputs from nearby vehicles.

13. The computer program product of claim 8, wherein the program code configured for identifying features collects external conditions selected from the group consisting of: a road condition, a weather condition, and a road closure.

14. The computer program product of claim 8, further comprising program code configured for inputting user preferences that augment the criteria regarding what constitutes a dangerous condition.

15. A method of performing interventions in a vehicle based on dangerous conditions, comprising:

identifying features on both a current vehicle and at least one nearby vehicle, wherein at least one of the features is indentified based on input from a communication system of the at least one nearby vehicle;

storing the features in a features table;

implementing an events table having criteria regarding what constitutes a dangerous condition for each of a set of features, and further determines what intervention should take place in response to a dangerous condition;

comparing sensor inputs to criteria in the events table to determine if a dangerous condition currently exists; and initiating an intervention in the event a dangerous condition currently exists.

16. The method of claim 15, wherein the step of identifying features identifies features stored in a features profile.

17. The method of claim 15, wherein the step of identifying features determines an availability and a status of each identified feature.

18. The method of claim 15, wherein the step of identifying features detects external inputs from at least one nearby vehicle.

19. The method of claim 15, wherein the step of identifying features collects external conditions selected from the group consisting of: road conditions, weather conditions, and road closures.

20. The method of claim 15, further comprising inputting user preferences that augment the criteria regarding what constitutes a dangerous condition.

* * * * *